(12) United States Patent
Kanda et al.

(10) Patent No.: US 6,896,090 B2
(45) Date of Patent: May 24, 2005

(54) VEHICLE STEERING DEVICE

(75) Inventors: Naotake Kanda, Nara (JP); Tomoyasu Kada, Osaka (JP); Kenji Higashi, Nara (JP); Ryouhei Hayama, Mie (JP); Takeo Iino, Osaka (JP); Shingo Maeda, Osaka (JP); Masayuki Ueno, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/463,410

(22) Filed: Jun. 18, 2003

(65) Prior Publication Data

US 2004/0060764 A1 Apr. 1, 2004

(30) Foreign Application Priority Data

Jun. 21, 2002 (JP) ..................... P.2002-181845

(51) Int. Cl.⁷ ............................................... B62D 5/00
(52) U.S. Cl. ..................... 180/402; 180/443
(58) Field of Search ......................... 180/402, 403, 180/447, 431, 443

(56) References Cited

U.S. PATENT DOCUMENTS

| | | | | |
|---|---|---|---|---|
| 4,566,116 A | * | 1/1986 | Nakano et al. | 378/121 |
| 4,751,976 A | * | 6/1988 | Higuchi et al. | 180/446 |
| 5,511,629 A | * | 4/1996 | Vogel | 180/447 |
| 6,000,490 A | * | 12/1999 | Easton | 180/402 |
| 6,138,788 A | * | 10/2000 | Bohner et al. | 180/405 |
| 6,382,344 B1 | * | 5/2002 | Lohner et al. | 180/444 |
| 6,481,526 B1 | * | 11/2002 | Millsap et al. | 180/402 |

FOREIGN PATENT DOCUMENTS

| | | | |
|---|---|---|---|
| DE | 23 59 807 | | 6/1974 |
| DE | 100 42 308 A1 | | 11/2001 |
| DE | 101 60 716 | | 6/2003 |
| JP | 1-233170 | | 9/1989 |
| JP | 2003335248 A | * | 11/2003 ........... B62D/05/04 |

OTHER PUBLICATIONS

European Search Report dated Mar. 23, 2004.

* cited by examiner

Primary Examiner—Daniel G. DePumpo
(74) Attorney, Agent, or Firm—McGinn & Gibb, PLLC

(57) ABSTRACT

In a normal state, a reaction force actuator (20) applies an operation reaction force to an steering member (2) through a planetary gear mechanism (6). When failure occurs in a steering actuator (12), the reaction force actuator (20) is turned off, and a plunger (13) locks the rotation of one element (18) which is connected to the reaction force actuator (20), in the planetary gear mechanism (6). In turn, a manual steering mode is set up in which a rotation of the steering member (2) is transmitted to a pinion gear (14) at a transmission ratio of the carrier (16) holding planetary gears (17) and a sun gear (15).

20 Claims, 11 Drawing Sheets

VEHICLE STEERING DEVICE

BACKGROUND OF THE INVENTION

The present invention relates to a vehicle steering device which steers the steered wheels by operating a steering member.

Recently, there has been provided a vehicle steering device based on a so-called steer-by-wire system (referred to also as SBW) in which a mechanical connection between a steering member, such as a steering wheel, and the steered wheels is removed, and a part of a steering force transmitting system is formed by an electrical path.

In a device disclosed in JP-A-01-233170, a steering position of a steering wheel is detected by an encoder provided on a steering shaft, and an advancing direction-of a vehicle is detected by use of a yaw rate gyro. The steered wheels are controlled in steering so that a difference between an advancing direction change instructing value based on a detected steering position and an actual advancing direction change quantity based on the detecting result by the yaw rate gyro, becomes zero.

In the steer-by-wire system of this type, however, a fail-safe measure for trouble, for example, wire disconnection, when it occurs in an electric motor as an actuator for the steering, is of importance.

SUMMARY OF THE INVENTION

Accordingly, an object of the invention is to provide a vehicle steering device which ensures a good steering operation even if trouble occurs in the steer-by-wire system.

In order to solve the aforesaid object, the invention is characterized by having the following arrangement.

Aspect 1. A vehicle steering device comprising:
a first element coupled to a steering member;
a second element coupled to a steered wheel;
a third element correlating the first and second element with each other, in which the first, second and third elements constitute a differential transmission mechanism;
a steering actuator for steering the steered wheel;
a reaction force actuator coupled to the third element to apply a steering reaction force to the steering member; and
a locking unit adapted to lock the third element to mechanically couple the first element with the second element.

Aspect 2. The vehicle steering device according to the aspect 1, wherein
the differential transmission mechanism includes a planetary transmission mechanism including a sun member, a planetary member and a ring member, and
the locking unit is capable of mechanically or electromagnetically locking the third element.

Aspect 3. The vehicle steering device according to the aspect 1, wherein
the differential transmission mechanism includes a planetary transmission mechanism including a sun member, a planetary member and a ring member,
an endless belt is provided for coupling the third element to the reaction force actuator to transmit a driving force therebetween, and
the locking unit includes a pair of shafts adapted to cause a tension side and a sagging side of the endless belt to approach each other.

Aspect 4. The vehicle steering device according to the aspect 1, wherein
the differential transmission mechanism includes a planetary transmission mechanism including a sun member, a planetary member and a ring member, a serration part is formed on an outer peripheral surface of the third element,
the locking unit includes a locking member having on an inner periphery thereof a serration part adapted to be in mesh with the serration part of the third element, and
the locking member is movable relative to the third element in an axial direction thereof.

Aspect 5. The vehicle steering device according to the aspect 1 further comprising:
a drive part which drives and set the locking unit to a locking state; and
a control unit which causes the drive part to set the locking unit to the locking state when a difference of a number of revolutions between the third element and the locking unit decreases to be below a predetermined value in a case of failure of the steering actuator.

Aspect 6. The vehicle steering device according to the aspect 5, wherein the control unit drives the reaction force actuator so that the difference of a number of revolutions between the third element and the locking unit decreases to be below the predetermined value.

Aspect 7. The vehicle steering device according to the aspect 1, wherein the locking unit locks the third element in a case of failure of the steering actuator.

Aspect 8. A vehicle steering device comprising:
a planetary transmission mechanism interposed between steering member and a steered wheel, which includes a sun member and a planetary member which are coupled to one of the steering member and the steered wheel and to the other, respectively, and ring member; and
a steering actuator for steering the steered wheel; and
a reaction force actuator coupled to one of the sun-member and the planetary member to apply a steering reaction force to the steering member,
wherein the ring member is movable between a locking position at which the ring member is coupled to the planetary member to lock the planetary member, and a non-locking position.

DETAILED DESCRIPTION OF PREFERRED EMBODIMENTS

The preferred embodiments of the present invention will be described with reference to the accompanying drawings.

First Embodiment

Figure 1:
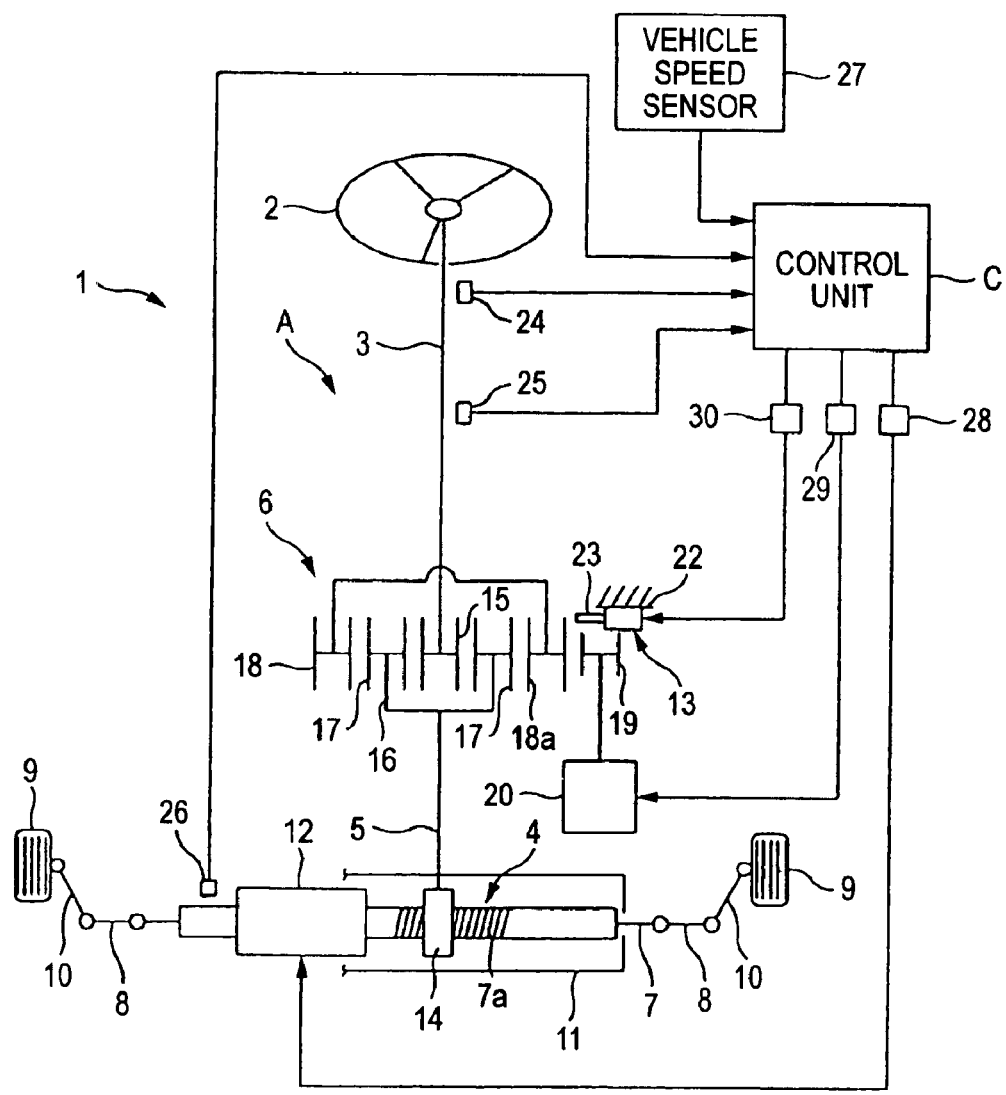
FIG. 1 is a model diagram showing a vehicle steering device which is an embodiment of the invention.

FIG. 1 is a schematic diagram showing a vehicle steering device according to a first embodiment of the invention. In FIG. 1, a vehicle steering device 1 includes a first steering shaft 3 coupled to a steering member 2 such as a steering wheel so as to be integrally rotatable, a second steering shaft 5 which is coupled with a steering mechanism 4 such as a rack/pinion mechanism, which is disposed coaxially with the first steering shaft 3, and a planetary gear mechanism 6 as a planetary transmission mechanism forming a differential transmission mechanism which allows a differential rotation between the first and second steering shafts 3 and 5.

The steering mechanism 4 includes a steering shaft 7 disposed extending in a horizontal direction of the vehicle, and knuckle arms 10 which are coupled to ends of the steering shaft 7 and support steered wheels 9, respectively. The steering shaft 7 is axially and slidably supported by a housing 11. A steering actuator 12 is coaxially fit to the steering shaft at the mid part of the shaft. A rotation of the steering actuator 12 is converted into a sliding motion by a motion converting mechanism, such as a ball screw mechanism. The steered wheels 9 are steered according to the sliding motion of the steering shaft 7.

One of the features of the instant embodiment resides in the following point. In a normal state, the vehicle steering device 1 operates as a steer-by-wire system in which a mechanical connection of the steering member 2 to the steered wheels 9 is removed at a mid part in a steering transmission system A between the steering member 2 and steered wheels 9. When trouble occurs in the steering actuator 12, the plunger 13 as a rotation locking unit locks the rotation of the ring gear 18 as an element of the planetary gear mechanism 6, whereby the vehicle steering device 1 operates as a manual steering device which operates at a transfer ratio of the remaining two elements, for example, a sun gear 15 and a carrier 16.

The plunger 13 may be an electromagnetic plunger, for example, a solenoid or a hydraulic plunger. The plunger 13 may be substituted by a power brake, a hysteresis brake, or a known electromagnetic brake. In the instant embodiment, the plunger 13 is of the electromagnetic type.

A rack gear 7a is formed on a part of the steering shaft 7. The rack gear 7a is engaged with a pinion gear 14 which rotates together with the second steering shaft 5 and is provided at an end of the second steering shaft 5. As will be described later, at the time of failure in the steering actuator 12, when the second steering shaft 5 is driven to be rotated according to an operation of the steering member 2, a rotation of the second steering shaft 5 is converted into a sliding motion of the steering shaft 7 by the combination of the pinion gear 14 and the rack gear 7a, so that the steered wheels 9 are steered.

The planetary gear mechanism 6 includes: a sun gear 15 as a first element (sun member) which is coupled to the end of the first steering shaft 3 so as to be rotatable together with the first steering shaft 3 and serves as an input of the planetary gear mechanism; a plurality of gears 17 as a second element (planetary members) which are rotatably held by a carrier 16 serving as an output of the mechanism and in mesh with the sun gear 15; and a ring gear 18 as a ring member which has inner teeth 18a in mesh with the planetary gears 17.

The ring gear 18 constitutes a worm wheel, for example by forming outer teeth 18b thereon. The outer teeth 18b are coupled, in a driving manner, to a reaction force actuator 20 for applying an operation reaction force to the steering member 2 through a driving force transmission gear 19 constituted by a worm, for example. The reaction force actuator 20 is an electrically driven motor, for example, and fixed at an appropriate position of a vehicle body.

The plunger 13 of the electromagnetic type includes a fixing part 22 fixed to a fixing member, such as a steering column, and a movable member 23 which is extendable from the fixing part 22 and, when extended, presses on the outer peripheral surface of the ring gear 18. The fixing part 22 is not rotatable about the first steering shaft 3. The plunger 13 may be used as a single member, or a plurality of plungers 13 may be arranged around the ring gear 18 in a coaxial fashion. The movable member 23 of the plunger 13 is normally retracted as shown in FIG. 1, and is separated from the ring gear 18.

At the time of failure of the steering actuator 12, a solenoid, for example, contained in the plunger 13 is excited, so that the movable member 23 is extended to press on the ring gear 18 and to lock the rotation of the ring gear 18. As a result, a rotation of the steering member 2 is transmitted to the pinion gear 13 at a gear ratio of the sun gear 15 and the carrier 16, and thus the vehicle steering device 1 is put in a manual steering mode.

Referring to FIG. 1 again, the steering actuator 12, the reaction force actuator 20 and the plunger 13 are controlled by a control unit C containing a microprocessor and others.

The first steering shaft 3 includes a steering angle sensor 24 as a steering position sensor for detecting a steering angle (steering position) generated by the steering member 2, and a torque sensor 25 for detecting a steering torque inputted from the steering member 2. Detecting signals from the steering angle sensor 24 and the torque sensor 25 are input to the control unit C.

The steering mechanism 4 includes a steering position sensor 26 for detecting a steering position in connection with an axial position of the steering shaft 7. A detecting signal from the steering position sensor 26 is input to the control unit C. Further, a detecting signal from a vehicle speed sensor 27 for detecting a vehicle speed is input to the control unit C.

Based on the signals from those sensors, the control unit C outputs control signals to drive circuits 28, 29 and 30 which serves as driving parts for driving the steering actuator 12, the reaction force actuator 20 and the plunger 13, respectively.

Figure 2:
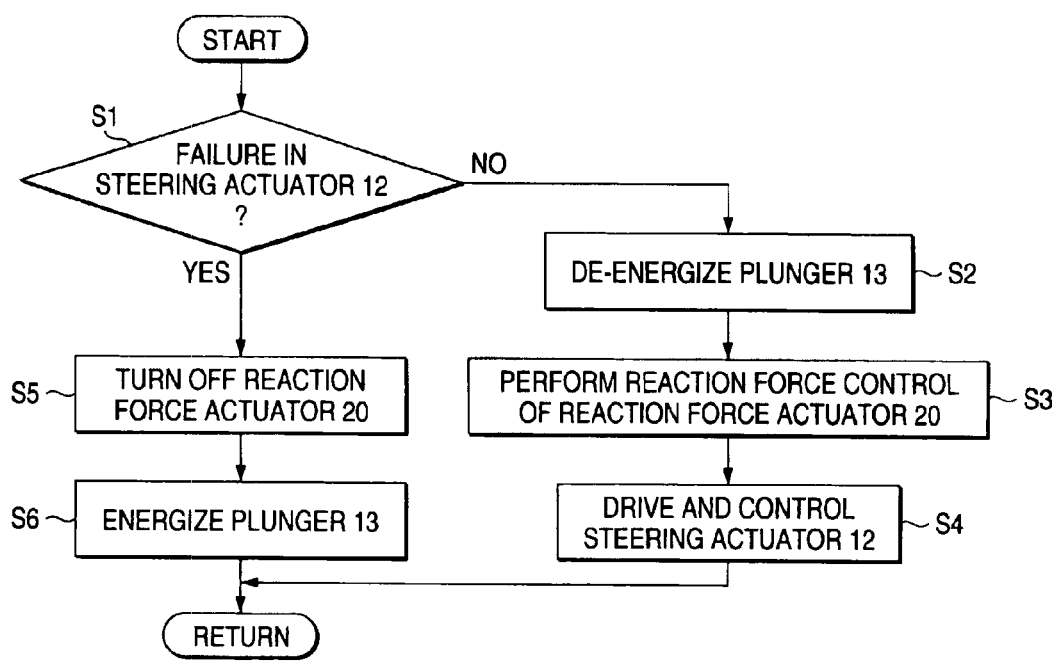
FIG. 2 is a flowchart showing a control flow of a steering control by the vehicle steering device of FIG. 1.

FIG. 2 is a flow chart showing a control flow of a steering control process executed by the control unit C. In FIG. 2, the control unit C monitors whether the steering actuator 12 operates normally (step S1).

If no failure occurs in the steering actuator 12 (NO in the step S1), the control unit C does not energizes the electromagnetic plunger 13 (step S2), and causes the reaction force actuator 20 to generate a torque to apply an operation reaction force which depends on a road reaction, for example, to the steering member 2 (step S3).

Ratios (transmission ratios, gear ratios) of a rotation quantity of the steering member 2 and a steering quantity of the steered wheels 9 are set in accordance with running states of the vehicle, for example (VGR (variable gear ratio) function) Voltage command values of the steering actuator 12 are set in accordance with those set transmission ratios and manipulation quantities of the steering member 2. The control unit applies control signals based on those set voltage command values to the drive circuit 28, and drives the steering actuator 12 (step S4).

As a result, the steering actuator 12 generates a torque to slide the steering shaft 7 in a direction which is based on an operation direction of the steering member 2. Thus, a good steering operation based on a running state of the vehicle and an operation state of the steering member 2 is secured. Incidentally, the VGR function is not essential.

When failure occurs in the steering actuator 12 during the control of the steering actuator 12 (YES in step S1), the control unit C outputs a control signal to the drive circuit 29 to turn off the reaction force actuator 20 (to set up an idling possible state), as well as outputs a control signal to the drive circuit 30 to electromagnetically energize the electromagnetic plunger 13, which has not been energized (steps S5 and S6). In this way, the steering member 2 is mechanically coupled with the steering mechanism 4 through the planetary gear mechanism 6, and the vehicle steering device is put to the manual steering mode.

As described above, in a normal state, the vehicle steering device according to the embodiment functions as a vehicle steering device based on the steer-by-wire system, and in this mode, an appropriate steering reaction force is applied to the steering member 2 by the reaction force actuator 20, and if necessary, the vehicle steering device exhibits a VGR function. When failure occurs in the steering actuator 12, the steering member 2 is mechanically coupled with the steering mechanism 4 through the planetary gear mechanism 6 by a simple structure for locking a rotation of one element of the planetary gear mechanism 6, and therefore good manual steering is achieved.

Second Embodiment

Figure 3:
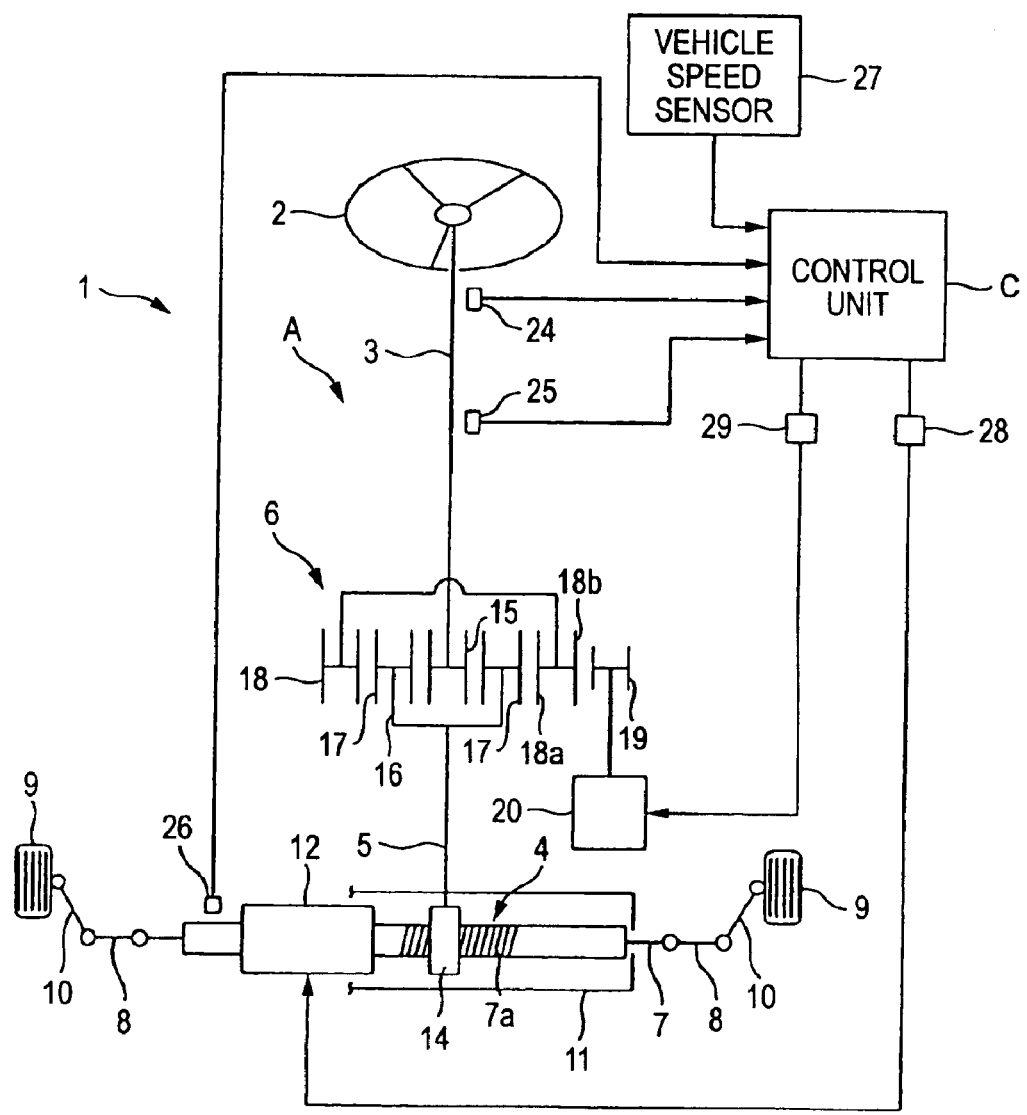
FIG. 3 is a model diagram showing a vehicle steering device according to a third embodiment of the invention.
Figure 4:
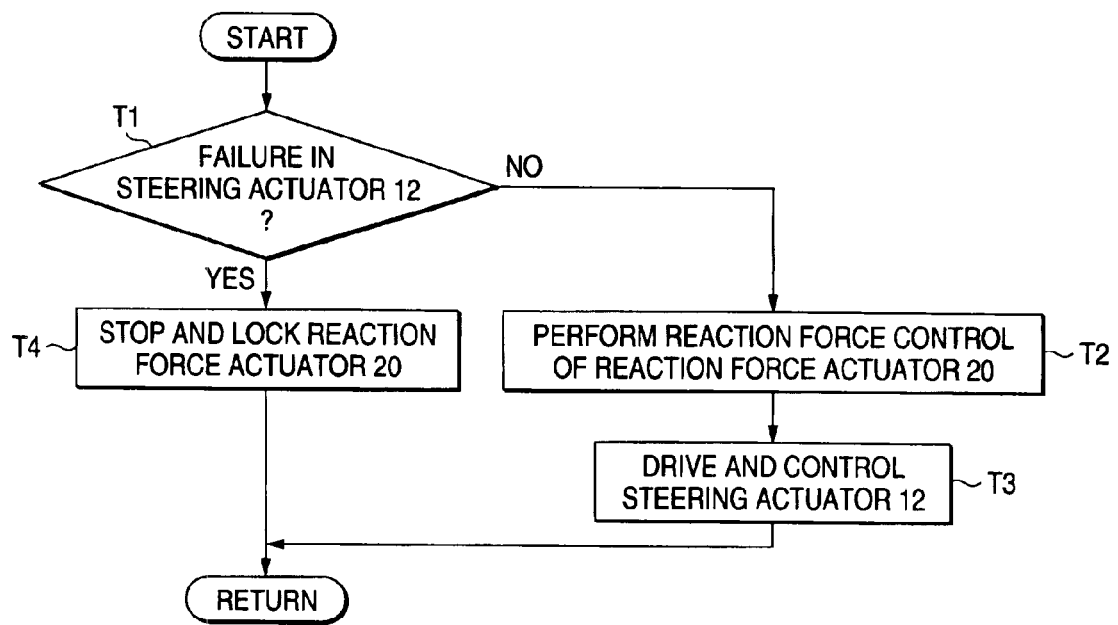
FIG. 4 is a flowchart showing a control flow of a steering control by the vehicle steering device of FIG. 3.

FIGS. 3 and 4 show a second embodiment of the invention. A major difference of the second embodiment from the first embodiment of FIG. 1 resides in that the plunger 13 as a locking unit in the first embodiment already described is not used, and when trouble occurs in the steering actuator 12, the operation of the reaction force actuator 20 is stopped, and the reaction force actuator is used as a locking unit. With disuse of the plunger 13, the drive circuit 30 for driving the plunger 13 is also not used. Other mechanical configurations are similar to those in the first embodiment of FIG. 1. Accordingly, the same reference numerals are applied to equivalent portions in the second embodiment already described, and the description of the equivalent portions is omitted for simplicity.

FIG. 4 is a flow chart showing a control flow of a steering control process executed by the control unit C. In FIG. 4, the control unit C monitors whether or not the steering actuator 12 operates normally (step T1).

When no trouble occurs in the steering actuator 12 (NO in the step T1), the control unit C causes the reaction force actuator 20 to generate a torque for applying an operation reaction force, which is based on a road reaction force, for example, to the steering member 2 (step T2).

Ratios (transmission ratios, gear ratios) of a rotation quantity of the steering member 2 and a steering quantity of the steered wheels 9 are set in accordance with running states of the vehicle, for example (VGR function). Voltage command values of the steering actuator 12 are set based on those set transmission ratios and manipulation quantities of the steering member 2. Based on those set voltage command values, the control unit applies control signals to the drive circuit 28 and drives the steering actuator 12 (step T3).

As a result, the steering actuator 12 generates a torque to slide the steering shaft 7 in a direction which is based on an operation direction of the steering member 2, and therefore a good steering operation based on a running state of the vehicle and an operation state of the steering member 2 is secured. Incidentally, the VGR function is not essential.

When trouble occurs in the steering actuator 12 during the control of the steering actuator 12 (YES in step TS1), the control unit C outputs a control signal to the drive circuit 29 to stop and lock the operation of the reaction force actuator 20, to thereby lock the rotation of the ring gear 18 (step T4). In this way, the steering member 2 is mechanically coupled with the steering mechanism 4 through the planetary gear mechanism 6, and the vehicle steering device operates as a manual steering device having a gear ratio of the sun gear 15 and the carrier 16.

Third Embodiment

Figure 5A:
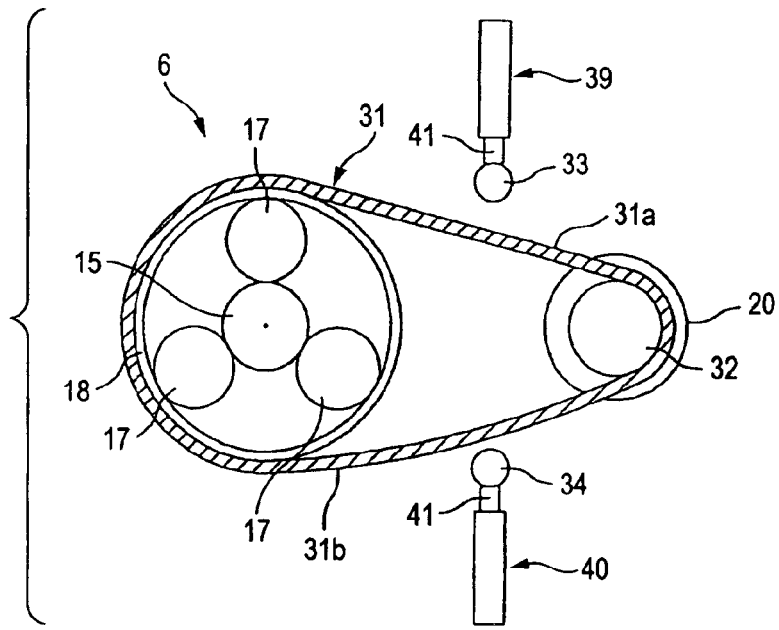
FIGS. 5A and 5B are model diagrams showing locking unit according to a third embodiment of the present invention.
Figure 5B:
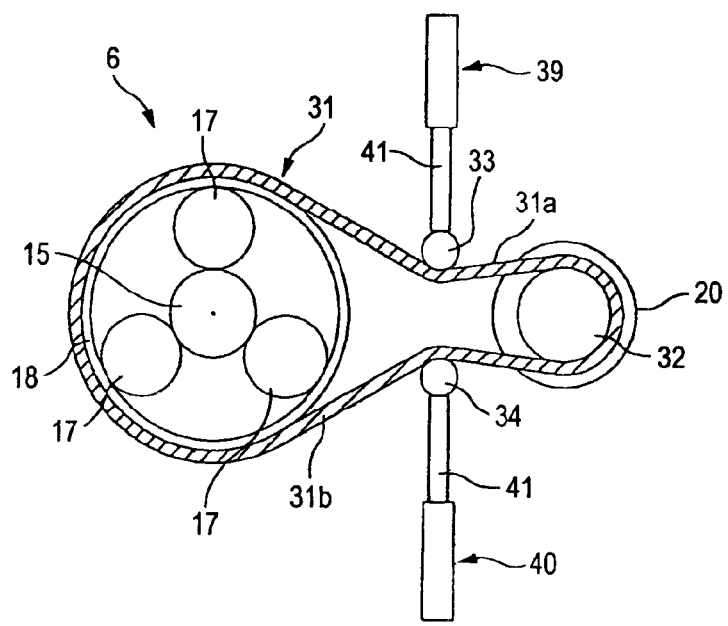
Figure 6:
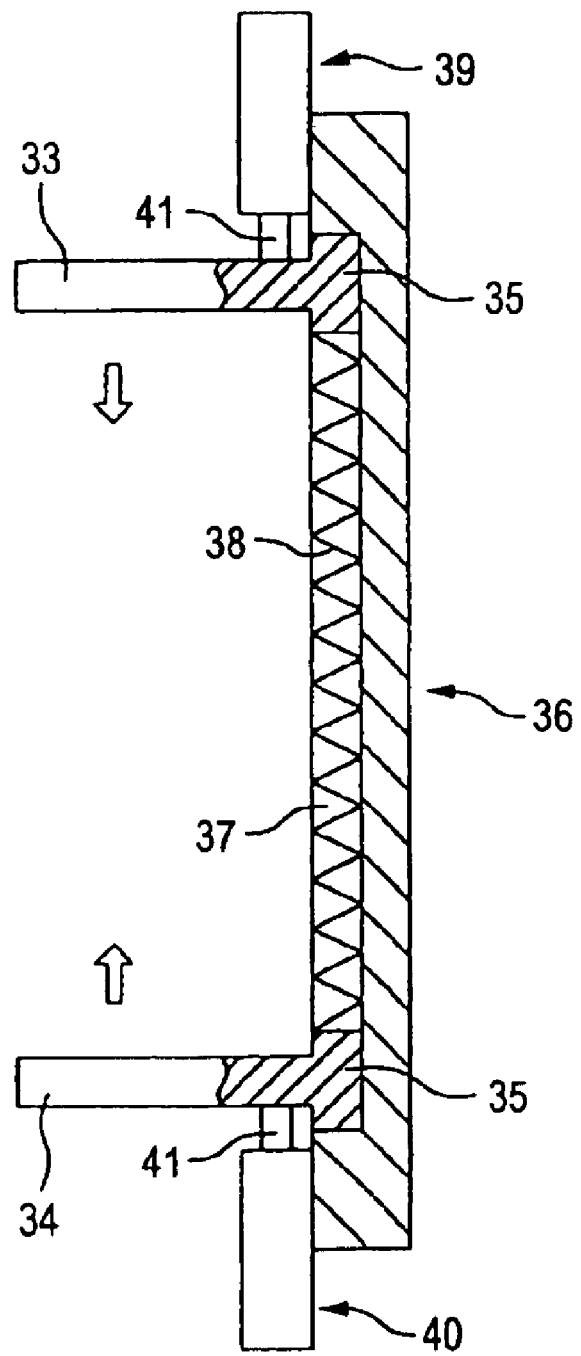
FIG. 6 is a cross sectional view showing a mechanism for a supporting locking unit in FIG. 5.

FIGS. 5A and 5B show a key portion of a planetary transmission mechanism in a third embodiment of the invention. FIG. 6 is a cross sectional view showing a mechanism for supporting a pair of shafts 33 and 34 as a locking unit in FIG. 5. In FIGS. 5 and 6, in the third embodiment, a torque is transmitted between the ring gear 18 and the reaction force actuator 20, through an endless belt 31. The reaction force actuator 20 may be an electrically driven motor, and drives and rotates a driving force transmission pulley 32 which is coaxially coupled to the rotary shaft of the motor. The belt 31 is wound on the outer peripheral surfaces of the driving-force transmission pulley 32 and the ring gear 18.

In the third embodiment, a pair of shafts 33 and 34 is provided as a locking unit, which causes a tension side 31a and a sagging side 31b of the belt 31 to approach each other. The shafts 33 and 34 includes bases 35, respectively. Those bases are slidably held in a guide groove 37 of a support member 36. The structure allows the shafts 33 and 34 to move close to each other and to move apart from each other. An urging member 38, for example, a compression coiled spring, is interposed between the bases 35. The urging member urges those bases to move apart from each other. Those shafts 33 and 34 are driven to move close to each other along the guide groove 37 by electromagnetic or hydraulic plungers 39 and 40 having extendable movable parts 42, such as solenoids.

A control flow of a steering control in the third embodiment is similar to that flow charted in FIG. 2 if the plunger 13 is substituted by the plungers 39 and 40. In the embodiment, in a normal state, the plungers 39 and 40 are not energized and the pair of shafts 33 and 34 are separated from the belt 31 by the urging member 38.

When failure occurs in the steering actuator 12, the plungers 39 and 40 are energized to extend the movable parts 41 thereof and to press them against the belt 31. As a result, the tension side 31a and the sagging side 31b of the belt are highly tensioned and put in a comparable state. In this state, the running belt 31 is stopped, and hence, the ring gear 18 is locked in rotation. The vehicle steering device operates as a manual steering device which operates at a transmission ratio of the sun gear 15 and the carrier 16.

Fourth Embodiment

Figure 7:
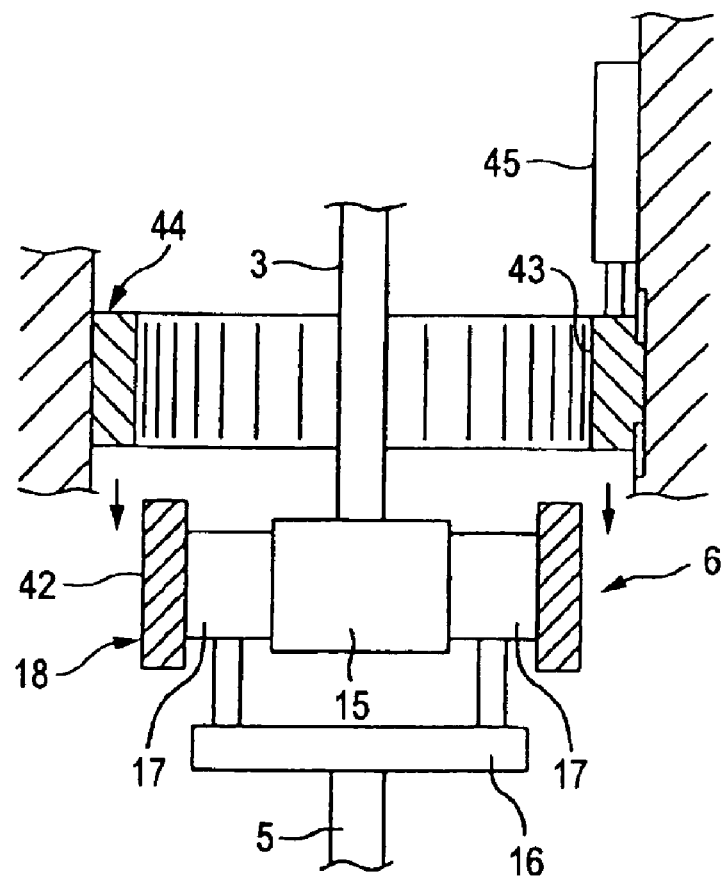
FIG. 7 is a cross sectional view showing, in a model form, a key portion of a vehicle steering device according to a fourth embodiment of the invention.

FIG. 7 shows a locking unit according to a fourth embodiment of the invention which is a modification of the third embodiment of the invention. In FIG. 7, in the fourth embodiment, a serration part 42 is formed on the outer peripheral surface of the ring gear 18. As the locking unit, there is provided an annular locking member 44 including on the inner periphery a serration part 43 which may be in mesh with the serration part 42 of the ring gear 18. The locking member 44 is movable relative to the ring gear 18 in the axial direction, but unrotative.

In a normal state, the locking member 44 is urged by an urging member (not shown), such as a compression coiled spring, and is decoupled from the ring gear 18. In a failure state of the steering actuator, the locking member 44 is driven to move in the axial direction by a plunger 45 of the electromagnetic type, for example, and therefore the locking member 44 is fit to the ring gear 18 and serration coupled to the latter, whereby the ring gear 18 is locked in rotation.

Fifth embodiment

Figure 8:
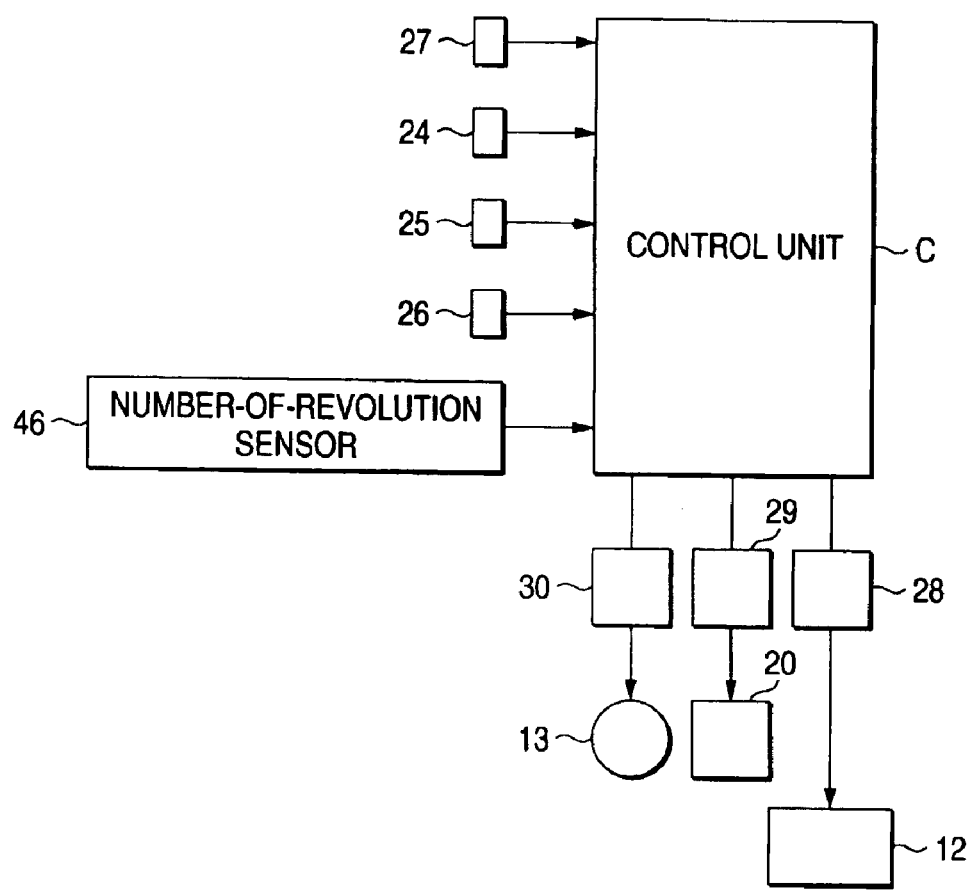
FIG. 8 is a block diagram showing an electrical configuration of a control unit of a vehicle steering device according to a fifth embodiment of the invention.

FIG. 8 is a block diagram showing an electrical configuration of a control unit of a vehicle steering device according to the fifth embodiment of the invention. A major difference of the fifth embodiment of FIG. 8 from the first embodiment of FIG. 1 resides in the following point. As shown in FIG. 8, a number-of-revolution sensor 46 is provided which detects a number of revolutions of the ring gear 18 which is an element to be locked in rotation when failure occurs in the steering actuator 12. A signal output from the number-of-revolution sensor 46 is applied to the control unit C. When a difference of a number of revolutions detected by the number-of-revolution sensor 46 decreases to be below a predetermined value, the control unit C energizes the plunger 13 and presses it against the ring gear 18 to thereby lock its rotation.

A steering control process executed by the control unit C will be described with reference to a flow chart of FIG. 9. The control unit C monitors whether the steering actuator 12 operates normally (step R1).

If no trouble occurs in the steering actuator 12 (NO in the step R1), the control unit C does not energize the electromagnetic plunger 13 (step R2) to cancel the locking state of the ring gear 18, and causes the reaction force actuator 20 to generate a torque to apply an operation reaction force according to a road reaction, for example, to the steering member 2 (step R3).

Ratios (transmission ratios, gear ratios) of a rotation quantity of the steering member 2 to a steering quantity of the steered wheels 9 are set in accordance with running states of the vehicle, for example (VGR function). Voltage command values of the steering actuator 12 are set based on those set transmission ratios and manipulation quantities of the steering member 2. The control unit applies control signals based on those set voltage command values to the drive circuit. 28, and drives the steering actuator 12 (step R4).

As a result, the steering actuator 12 generates a torque to slide the steering shaft 7 in a direction according to an operation direction of the steering member 2, and therefore a good steering operation according to a running state of the vehicle and an operation state of the steering member 2 is secured. Incidentally, the VGR function is not essential.

When trouble occurs in the steering actuator 12 during the control of the steering actuator 12 (YES in step R1), the control unit C outputs a control signal to the drive circuit 29 to turn off the reaction force actuator 20 (step R5).

Then, the control unit computes a number of revolutions of the ring gear 18 by using a signal output from the number-of-revolution sensor 46 (step R6). If the number of revolutions computed is below a predetermined value (step R7), the control unit outputs a control signal to the drive circuit 30, and the energized plunger 13 as the locking unit locks the ring gear 18 in rotation (step R8). In this way, the vehicle steering device is operated as a manual steering device which operates at a transmission ratio of the sun gear 15 and the carrier 16.

If the control unit causes the plunger to forcibly lock the rotation of the ring gear in a state that the number of revolutions of the ring gear 18 is still large, there is a fear that overload is imparted to the plunger 13 as one form of the locking unit, possibly damaging the plunger. However in the fifth embodiment, the vehicle steering device shifts its operation mode to the manual steering mode without any damage of the plunger 13 as the locking unit when trouble occurs in the steering actuator 12.

Sixth Embodiment

Figure 9:
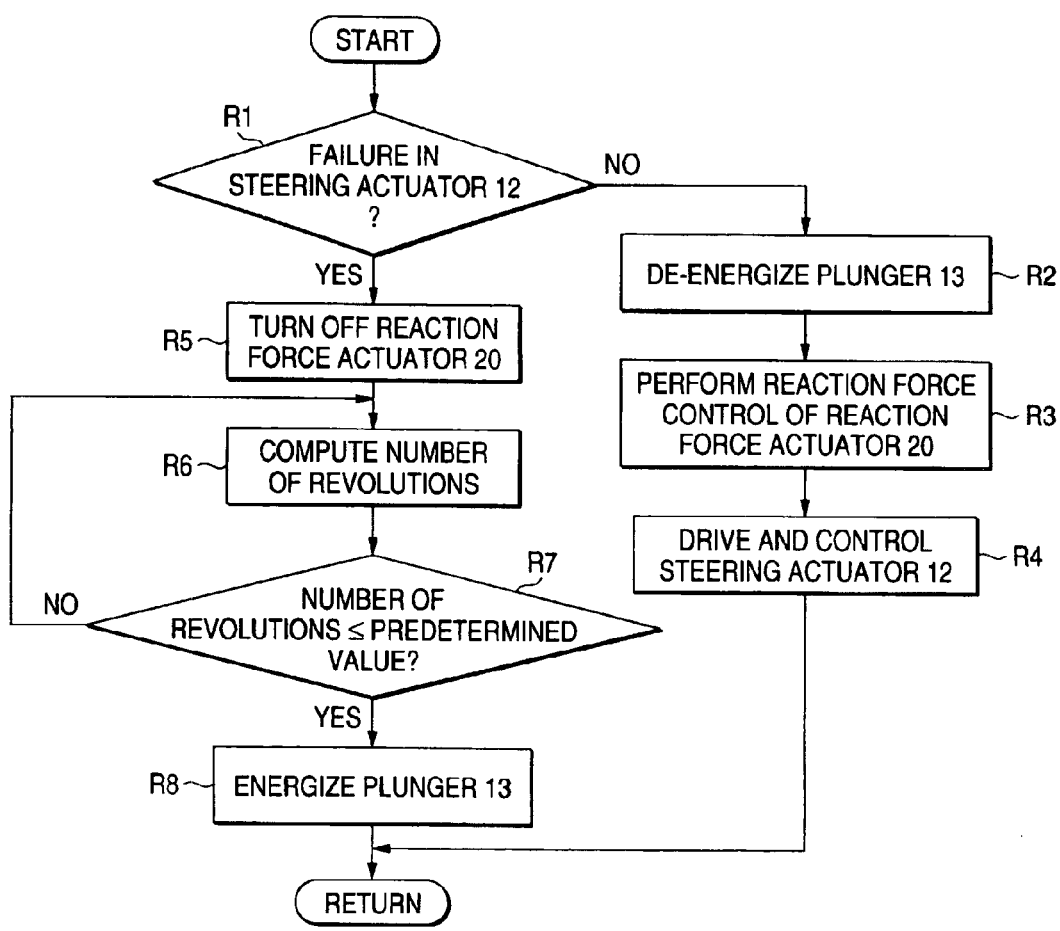
FIG. 9 is a flow chart showing a control flow of a steering control by the vehicle steering device of FIG. 8.
Figure 10:
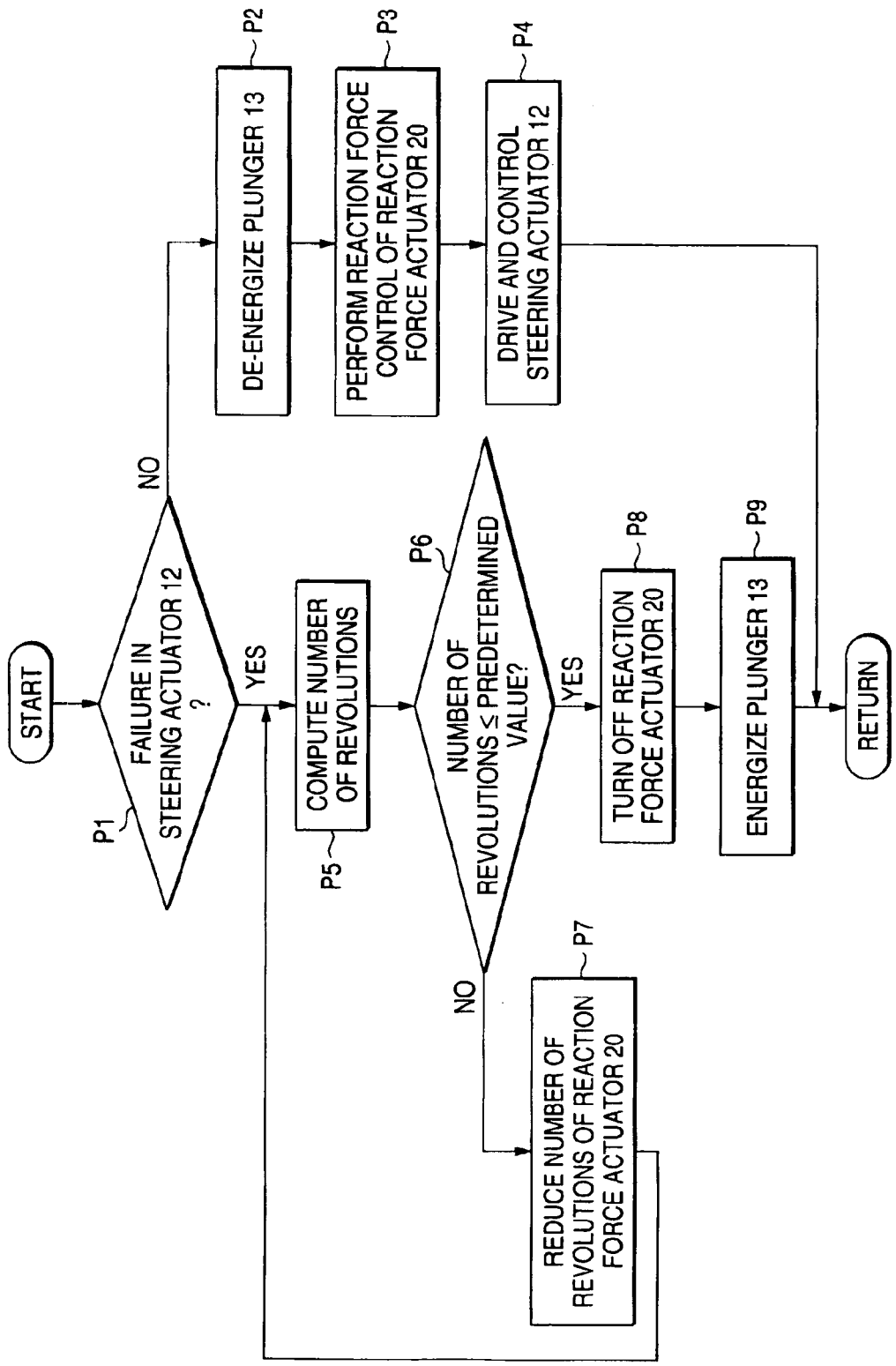
FIG. 10 is a control flow of a steering control by a vehicle steering device according to a sixth embodiment of the invention.

FIG. 10 is a flow chart showing a control flow of a sixth embodiment of the present invention which is a modification of the steering control according to the fifth embodiment of FIG. 9. In FIG. 10, the control unit C monitors whether the steering actuator 12 operates normally (step P1).

If no failure occurs in the steering actuator 12 (NO in the step P1), the control unit C does not energizes the electromagnetic plunger 13 (step P2), and causes the reaction force actuator 20 to generate a torque to apply an operation reaction force in response to a road reaction force, for example, to the steering member 2 (step P3).

Ratios (transmission ratios, gear ratios) of a rotation quantity of the steering member 2 to a steering quantity of the steered wheels 9 are set in accordance with, for example, running states of the vehicle (VGR function). Voltage command values of the steering actuator 12 are determined based on those set transmission ratios and manipulation quantities of the steering member 2. The control unit applies control signals based on those selected voltage command values to-the drive circuit 28, and drives the steering actuator 12 (step P4).

As a result, the steering actuator 12 generates a torque to slide the steering shaft 7 in a direction according to an operation direction of the steering member 2, and therefore a good steering operation according to a running state of the vehicle and an operation state of the steering member 2 is secured. Incidentally, the VGR function is not essential.

When failure occurs in the steering actuator 12 during the control of the steering actuator 12 (YES in step P1), the control unit computes a number of revolutions of the ring gear 18 which is an element whose rotation is to be locked based on a signal from the number-of-revolution sensor 46 (step P5). If the number of revolutions computed exceeds the predetermined value (NO in step P6), the control unit drives the steering actuator 12 in such a direction as to reduce the number of revolutions (step P7). If the number of revolutions decreases to below the predetermined value (YES in step P6), the control unit C outputs a control signal to the drive circuit 29 and to turn off the reaction force actuator 20 (step P8).

Then, the control unit outputs a control signal to the drive circuit. 30 to lock the rotation of the ring gear 18 by use of the energized plunger 13 as the locking unit (step P9). In this way, the steering member 2 is mechanically coupled with the steering mechanism 4 through the planetary gear mechanism 6, and the vehicle steering device operates as a manual steering device which operates at the transmission ratio of the sun gear 15 and the carrier 16.

In the sixth embodiment, when trouble occurs in the steering actuator 12, the vehicle steering device quickly shifts its operation mode to the manual steering mode without any damage of the plunger 13 as the locking unit.

In the fifth and sixth embodiments of FIGS. 9 and 10, the plunger 13 of FIG. 1 as the locking unit may be substituted by the shafts 33 and 34 in FIG. 5 or the annular locking member 44 in FIG. 7.

Seventh Embodiment

Figure 11:
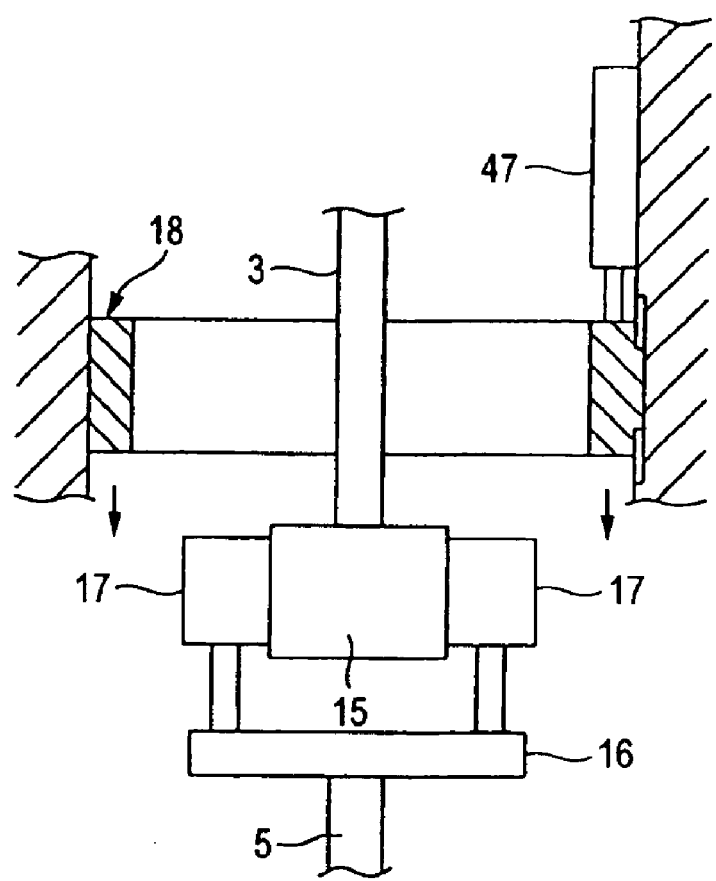
FIG. 11 is a cross sectional view showing, in a model form, a key portion of a vehicle steering device according to a seventh embodiment of the invention.

Turning now to FIG. 11, there is shown seventh embodiment of the invention. In FIG. 11, a ring gear 18 as a ring member is not rotatable, but is movable in the axial direction. The ring gear 18 axially moves selectively to a locking position and a non-locking position. At the locking position, the ring gear is coupled with a planetary gear 17 as a planetary member to thereby lock the motion of the planetary gears 17. At the non-locking position, the coupling of the ring gear with the planetary gear is canceled. Reference numeral 47 is a drive part, such as an electromagnetic plunger, for driving and moving the ring gear 18 in the axial direction.

In the seventh embodiment, in a normal state, the ring gear 18 is decoupled from the planetary gears 17. When failure occurs in the steering actuator 12, the unrotatable ring gear 18 is coupled to the planetary gears 17 to thereby set up a manual steering mode in which the vehicle steering device operates at the transmission rate of the sun gear 15 and the carrier 16. In the fourth embodiment, what a designer has to do is to couple the reaction force actuator 20 to the sun gear 15 or the carrier 16 so as to allow the transmission of a driving force thereto.

In the embodiments mentioned above, the locking unit may be fixed in an unrotative state. Alternatively, in a normal state, the locking unit rotates at a given number of revolutions. In a trouble state of the steering actuator, the locking unit is made unrotary instantaneously or with some time lag.

Modification

In each of the embodiments of FIGS. 9 and 10, the plunger 13 as the locking unit is fixed and unrotative. Because of this, each embodiment uses the number-of-revolution sensor 46 for detecting the number of revolutions of the ring gear 18. In a case where the locking unit is rotatable at a given number of revolutions, a sensor may be used for detecting a difference between the number of revolutions of the locking unit and that of a member whose motion is locked by the locking unit.

In the embodiments mentioned above, the sun gear 15 as the first element is coupled to the steering member 2, and the carrier 16 as the second element for supporting the planetary gears 17 is coupled to the steered wheels 9. In an alternative, two of the sun gear 15, the carrier 16 and the ring gear 18 are selectively used for the first element coupled to the steering member 2 and the second element coupled to the steered wheels 9. The remaining one gear is used for the third element. The reaction force actuator 20 is coupled to the third element so as to allow the transmission of a driving force thereto.

Further, the planetary gear mechanism 6 may be substituted by a planetary roller mechanism.

In the invention, in a failure state of the steering actuator, the third element of the differential transmission mechanism is locked to be made unrotative. In case where the driver desires to use the manual steering, the third element of the differential transmission mechanism may be locked to be unrotative by operating an operation unit separately provided. By so doing, no problem is presented to the driver who has a disrelish for the SBW.

It should be understood that the present invention may variously be modified, altered and changed within the scope of the invention.

What is claimed is:

1. A steer-by-wire system for a vehicle steering device comprising:
   a first element coupled to a steering member;
   a second element coupled to a steered wheel;
   a third element correlating the first and second elements with each other, in which the first, second and third elements comprise a differential transmission mechanism;
   a steering actuator for steering the steered wheel;
   a reaction force actuator coupled to the third element to apply a steering reaction force to the steering member; and
   a locking unit adapted to lock the third element to mechanically couple the first element with the second element.

2. The steer-by-wire system according to claim 1, wherein the differential transmission mechanism comprises a planetary transmission mechanism including a sun member, a planetary member and a ring member, and
   the locking unit is capable of mechanically or electromagnetically locking the third element.

3. The steer-by-wire system according to claim 1, wherein the differential transmission mechanism includes a planetary transmission mechanism including a sun member, a planetary member and a ring member,
   an endless belt is provided for coupling the third element to the reaction force actuator to transmit a driving force therebetween, and
   the locking unit includes a pair of shafts adapted to cause a tension side and a sagging side of the endless belt to approach each other.

4. The steer-by-wire system according to claim 1, wherein the differential transmission mechanism includes a planetary transmission mechanism including a sun member, a planetary member and a ring member,
   a serration part is formed on an outer peripheral surface of the third element,
   the locking unit includes a locking member having on an inner periphery thereof a serration part adapted to be in mesh with the serration part of the third element, and
   the locking member is movable relative to the third element in an axial direction thereof.

5. The steer-by-wire system according to claim 1 further comprising:
   a drive part which drives and set the locking unit to a locking state; and
   a control unit which causes the drive part to set the locking unit to the locking state when a difference of a number of revolutions between the third element and the locking unit decreases to be below a predetermined value in a case of failure of the steering actuator.

6. The steer-by-wire system according to claim 5, wherein the control unit drives the reaction force actuator so that the difference of a number of revolutions between the third element and the locking unit decreases to be below the predetermined value.

7. The steer-by-wire system according to claim 1, wherein the locking unit locks the third element in a case of failure of the steering actuator.

8. The steer-by-wire system according to claim 1, wherein the differential transmission mechanism comprises a planetary transmission mechanism.

9. The steer-by-wire system according to claim 8, wherein the planetary transmission mechanism comprises a ring gear, and the reaction force actuator is connected to said ring gear.

10. The steer-by-wire system according to claim 8, wherein the planetary transmission mechanism comprises a ring gear, and said locking unit locks rotation of said ring gear.

11. The steer-by-wire system according to claim 10, wherein said locking unit locks rotation of said ring gear in case of a failure of said steering actuator.

12. The steer-by-wire system according to claim 11, wherein the vehicle steering device further comprises a control unit, and the control unit controls operation of said locking unit.

13. The steer-by-wire system according to claim 11, wherein the vehicle steering device further comprises a control unit, said control unit controlling operation of said locking unit and said reaction force actuator.

14. The steer-by-wire system according to claim 10, wherein said locking unit comprises a plunger extendable to lock rotation of said ring gear.

15. The steer-by-wire system according to claim 1, wherein said steering actuator is part of a steer-by-wire system.

16. The steer-by-wire system according to claim 15, wherein the vehicle steering device further comprises a control unit, said control unit controlling operation of said locking unit and operation of the steering actuator.

17. The steer-by-wire system according to claim 16, wherein the control unit also controls operation of said reaction force actuator.

18. The steer-by-wire system according to claim 10, wherein the planetary transmission mechanism comprises a sun gear, and said first element comprises said sun gear.

19. The steer-by-wire system according to claim 18, wherein the planetary transmission mechanism comprises a carrier supporting planetary gears, and said second element comprises said carrier.

20. A steer-by-wire system for a comprising:
- a planetary transmission mechanism interposed between steering member and a steered wheel, which includes a sun member and a planetary member which are coupled to one of the steering member and the steered wheel and to the other, respectively and ring member; and
- a steering actuator for steering the steered wheel; and
- a reaction force actuator coupled to one of the sun member and the planetary member to apply a steering reaction force to the steering member,
- wherein the ring member is movable between a locking position at which the ring member is coupled to the planetary member to lock the planetary member, and a non-locking position.

* * * * *